(12) United States Patent
Russell et al.

(10) Patent No.: US 7,052,143 B2
(45) Date of Patent: May 30, 2006

(54) PROJECTION DEVICE HAVING BLOWER AND/OR LAMP WITH FEEDBACK CONTROL

(75) Inventors: Brian Russell, Portland, OR (US); Pamela Deshon-Stepp, Canby, OR (US); Ken Edlow, Lake Oswego, OR (US)

(73) Assignee: InFocus Corporation, Wilsonville, OR (US)

( * ) Notice: Subject to any disclaimer, the term of this patent is extended or adjusted under 35 U.S.C. 154(b) by 0 days.

(21) Appl. No.: 10/860,782

(22) Filed: Jun. 2, 2004

(65) Prior Publication Data

US 2004/0263797 A1 Dec. 30, 2004

Related U.S. Application Data

(60) Provisional application No. 60/475,567, filed on Jun. 2, 2003.

(51) Int. Cl.
| | |
|---|---|
| G03B 21/18 | (2006.01) |
| G03B 21/26 | (2006.01) |
| G03B 21/20 | (2006.01) |
| G03B 21/00 | (2006.01) |
| G03B 7/08 | (2006.01) |
| G03B 13/00 | (2006.01) |
| H01J 13/32 | (2006.01) |

(52) U.S. Cl. ............... 353/58; 353/85; 353/121; 353/119; 396/231; 396/571; 315/117; 315/118

(58) Field of Classification Search ........... 353/52, 353/57–58, 85, 121, 119; 396/97, 225, 231, 396/571, 572, 575; 62/3.7; 315/112, 117, 315/118

See application file for complete search history.

(56) References Cited

U.S. PATENT DOCUMENTS

| 4,739,396 | A | | 4/1988 | Hyatt ................ 348/751 |
| 5,398,041 | A | * | 3/1995 | Hyatt ................ 345/88 |
| RE36,060 | E | * | 1/1999 | Miyashita ........... 348/748 |
| 6,472,828 | B1 | * | 10/2002 | Pruett et al. ......... 315/225 |
| 6,476,560 | B1 | * | 11/2002 | Terami et al. ........ 315/117 |
| 6,595,005 | B1 | * | 7/2003 | Immel ............... 62/3.7 |
| 6,621,239 | B1 | * | 9/2003 | Belliveau ............ 315/312 |
| 6,637,895 | B1 | | 10/2003 | Fujimori et al. ...... 353/119 |
| 6,886,942 | B1 | * | 5/2005 | Okada et al. ........ 353/52 |
| 2003/0218602 | A1 | * | 11/2003 | Naito ................ 345/204 |

* cited by examiner

*Primary Examiner*—W. B. Perkey
*Assistant Examiner*—Magda Cruz
(74) *Attorney, Agent, or Firm*—Alleman Hall McCoy Russell & Tuttle LLP

(57) ABSTRACT

In one example, a method for controlling temperature in a projection device, comprises measuring a plurality of temperatures in the projection device; averaging said plurality of temperatures to determine an averaged temperature; determining an error between a set-point temperature and said averaged temperature; and automatically adjusting a blower in said projection device based on said determined error. In another example, a method for controlling temperature in a projection device having a lamp and a blower comprises measuring temperature in the projection device; and selectively adjusting both a first signal to the blower and a second signal to the lamp based on said measured temperature to control temperature in the device.

26 Claims, 5 Drawing Sheets

PROJECTION DEVICE HAVING BLOWER AND/OR LAMP WITH FEEDBACK CONTROL

CROSS-REFERENCE TO RELATED APPLICATIONS

The present application claims priority under 35 U.S.C. § 119 to U.S. Provisional Patent Application Ser. No. 60/475,567, which was filed on Jun. 2, 2003. The disclosure of that application is hereby incorporated by reference in its entirety for all purposes.

TECHNICAL FIELD

The present disclosure relates generally to a projection device having a blower and/or a lamp with feedback control to regulate the temperature of the projection device.

BRIEF DESCRIPTION OF THE DRAWINGS

The disclosure is illustrated by way of example and not by way of limitation in the figures of the accompanying drawings, in which the like references indicate similar elements and in which.

DETAILED DESCRIPTION

Projection devices, such as projectors, may be used to project or display an image. Typically, projection devices include a lamp assembly, including a lamp or other light source, linked to a light engine or optical engine. Light may be directed from the light source through the light engine and through a projection lens to a display surface.

The temperatures within an operating projection device may be of concern. If temperatures exceed certain limits, portions of the device may degrade and/or have a shorter life span. For example, excessive temperatures may harm circuit elements within the projection device. Thus, maintaining temperatures within the device at preselected operating levels may reduce degradation of the device or early replacement of parts.

To help cool the projection device, one or more blowers may be provided within the interior of the projection device, and air inlet and outlet openings may be provided in the projection device housing. The blowers may be configured to pull air in through the inlet openings, around and past sensitive components inside the projection device housing, and then expel the air through the outlet openings. This circulation of ambient air through the projection device may help to keep sensitive components cool, and thus help to prolong the life of the components.

The use of blowers, such as blower motors, may result in generation of significant noise. Generally, the faster the speed at which the blower motor is operating, the more noise produced by the blower motor and blower wheels or blades. Thus, it may be possible to operate the blower in a lower range of suitable operating speeds. However, since blower speed affects airflow through the projection device and cooling of the projector device (and components thereof), selection of blower speed also impacts temperature. The actual operating temperature of the projection device may vary depending upon ambient temperature, altitude, humidity, etc. Where atmospheric factors combine to make heat removal more difficult, a low blower speed may be inadequate to cool the projection device sufficiently. Furthermore, in conditions where heat removal is relatively easy, a higher blower speed may be unnecessary and may cause unwanted noise.

A related issue involves the power provided to a projection device lamp. In conditions where heat removal is difficult, i.e. when the lamp is dissipating too much power, the blower may have difficulty removing heat from the projection device even when operating at a high speed.

Figure 1:
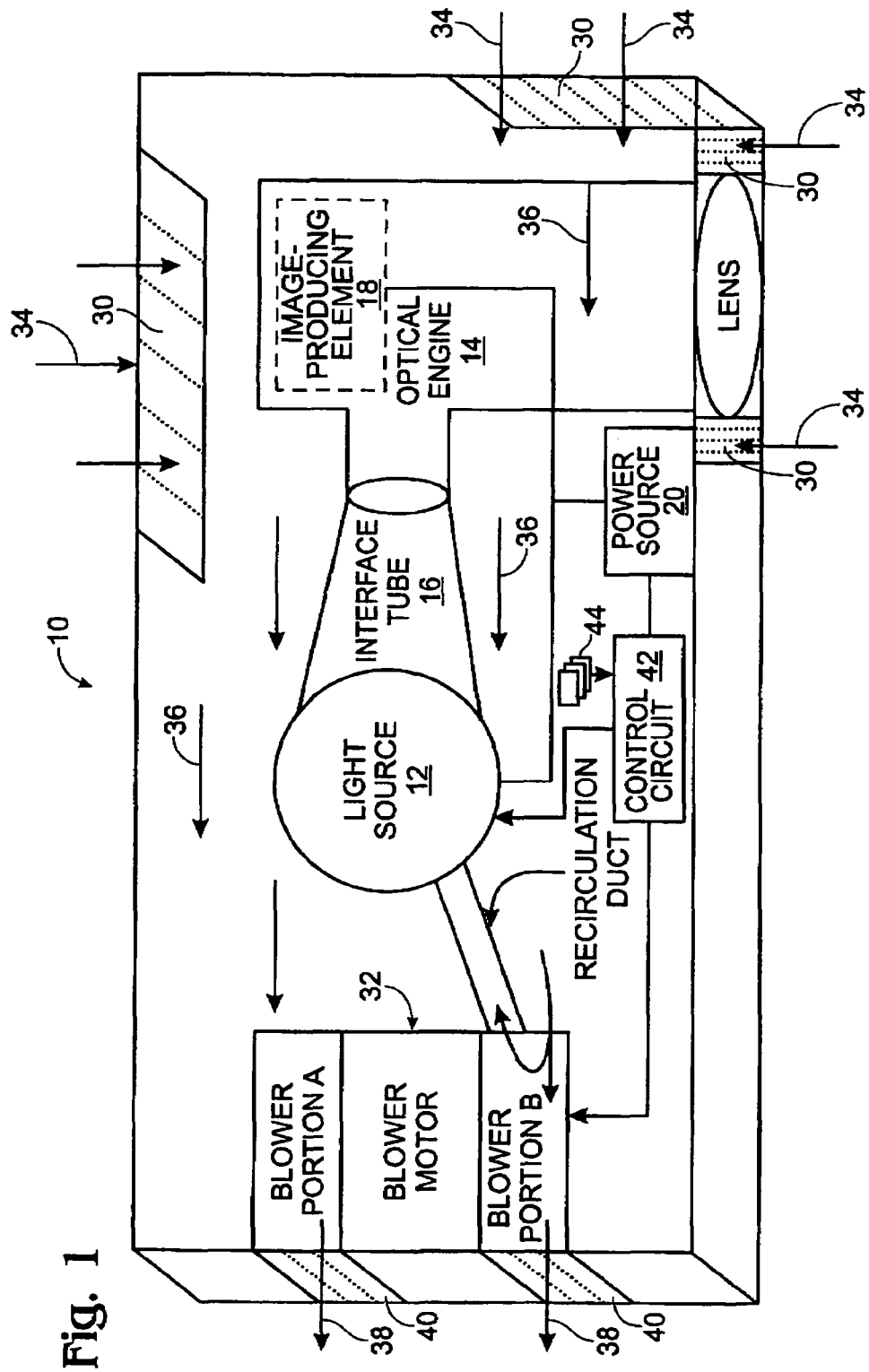
FIG. 1 is a schematic illustration of an exemplary projection device into which the present disclosure may be implemented according to one embodiment.

An exemplary projection device 10 according to an embodiment of the present disclosure is illustrated schematically in FIG. 1. The projection device 10 may be adapted to project an image on a display surface, including, but not limited to, a screen, a wall, or other viewing surface or area.

In some embodiments, the projection device 10 may be a projector or image-generating device that is able to project an image onto a display surface. As used herein, a projection device or image-generating device may include any suitable display device or image projector, including, but not limited to, a digital projector, a liquid crystal display (LCD) projector, a digital light processing projector, etc.

In its most basic form, the projection device 10 includes a light source (or lamp) 12 and an optical engine (or light engine) 14. The light source 12 may be adapted to produce a beam of light and project the light towards the optical engine 14, which may be configured to generate an image. The light source 12 typically includes a lamp positioned within a reflector that is configured to direct most of the emitted light along the optical path of the system. The light source 12 may include any suitable type of lamp. Examples include, but are not limited to, metal halide lamps and ultra-high-pressure (UHP) arc lamps, etc. The system also may include one or more filters, such as an infrared (IR) or ultraviolet (UV) filters, to filter out unwanted parts of the emission spectra of the lamp.

Light produced from the light source 12 may be channeled through an interface tube or spacer 16 to an optical engine 14. The optical engine 14 may include one or more or combinations of filters, color wheels, lenses, mirrors, integrators, condensers, and other optical elements.

Typically, the optical engine 14 may include an image-producing element 18. The image-producing element 18 may include any suitable image-generation device, including, but not limited to, a digital micromirror (DMD), an LCD panel, or any other suitable image source. Image-producing element 18 may be configured to project light toward one or more mirrors or other optics, which, in turn, may be configured to reflect light toward a display surface.

The projection device 10 typically includes one or more power sources 20. The power source 20 may be linked to the light source 12, the image-producing element 18, and other components, such as control circuit 42. Control circuit 42 can include various circuits, such as a power circuit board and control circuit board within the projection device. In one example, the power circuit board and control circuit board may include computer readable storage medium having instructions or code therein for carrying out actions directed by the routines described below. Further, these circuit boards may contain the feedback mechanisms (100, 200) described below. Also, control circuit 42 is configured to send a control signal to the blower 32 to vary the speed of the blower, and to send a control signal to light source 12 to vary the light source power level. Sensor 44, which may be temperature sensors, or other types of sensors, are also shown sending a signal to control circuit 42. Note, while multiple sensors are shown, a single sensor may be used.

As discussed above, the operating components, such as the power source 20 and light source 12, may output heat during operation of the device. If the temperature of the device exceeds certain limits, portions of the device may malfunction and/or have a shorter life span. Maintaining temperatures within the device at operational levels may reduce device malfunctioning or require early replacement of parts.

FIG. 1 shows a plurality of inlet vents, indicated generally at 30, and outlet vents, indicated generally at 40. A blower 32 draws air from outside the projection device into the projection device. Blower 32 may be a blower, a fan, or another air movement device, or combinations thereof. The cooling air 34 is circulated through the projection device (indicated by arrows 36) and expelled to the outside (indicated by arrows 38) through outlet vents 40. It should be appreciated that the number and position of the inlet vents and outlet vents may vary. Moreover, one or more blowers may be disposed in any suitable position within the projection device to help move air through the projection device.

One method of reducing the overall temperature of the device includes providing an air-cooling system. The air-cooling system may include one or more inlet vents 30, an air mover or blower 32, and one or more outlet vents 40. Such an air-cooling system may enable ambient air to be circulated through the projection device and then ejected, thus helping to cool projection device components.

The cooling needs of projection device 10 may vary depending upon ambient pressure and temperature conditions, as well as lamp operating conditions. Therefore, projection device 10 includes a temperature feedback mechanism that provides for the dynamic control of the blower power, and thus the internal temperature of the projection device.

Figure 2:
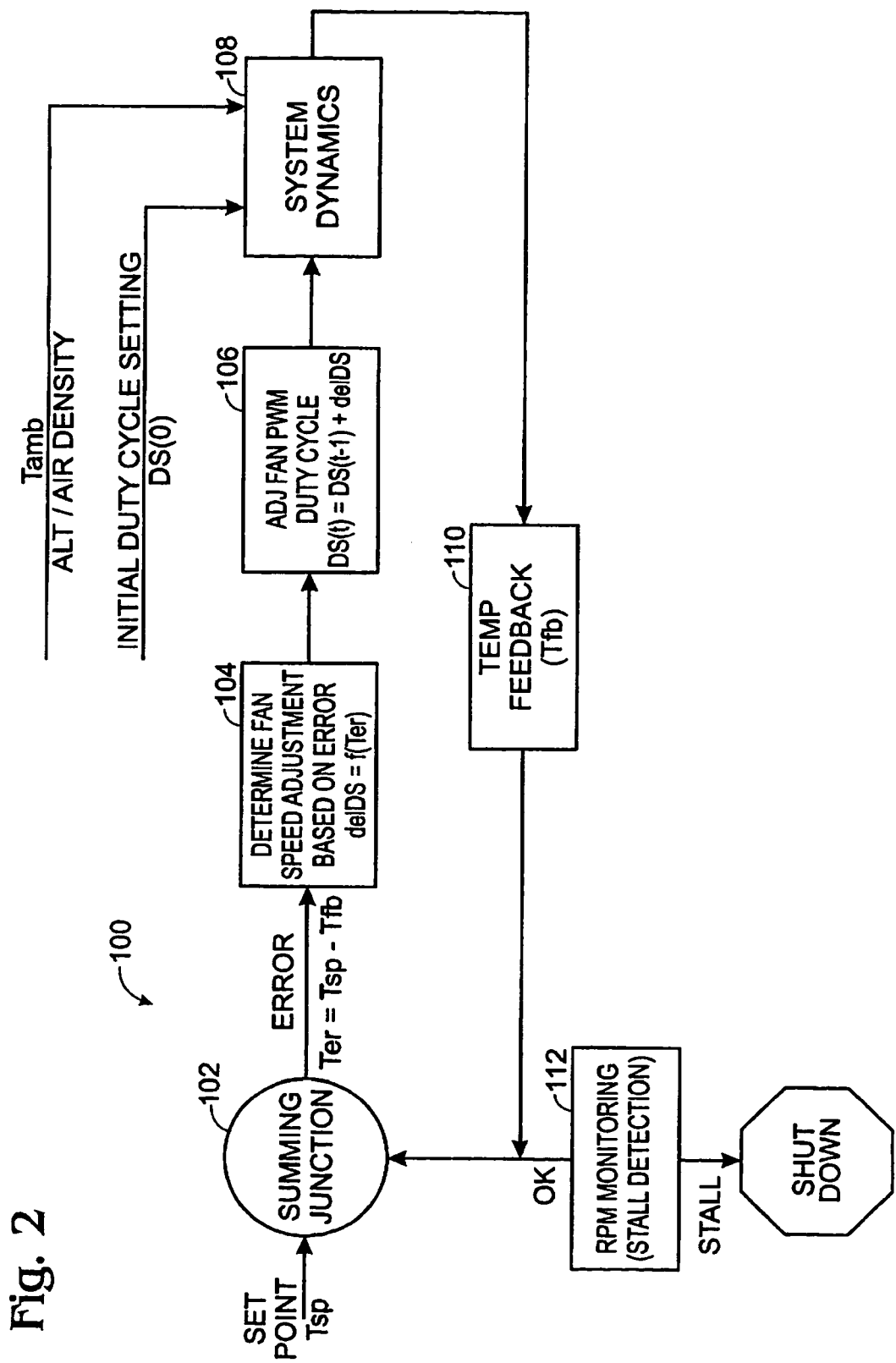
FIG. 2 is a block diagram showing an embodiment of a method of regulating the speed of a blower motor.

FIG. 2 shows a block diagram illustrating generally the basic components of the blower power feedback mechanism, generally at 100. Blower power feedback mechanism 100 may include a summing junction 102 at which a measured projection device temperature (Tfb) is compared to a preselected set point temperature (Tsp). The difference between the two temperatures is defined as the error temperature (Ter). Next, blower power feedback mechanism 100 may include a blower speed adjustment mechanism 104 for determining the blower speed adjustment necessary based upon the error. Blower speed adjustment mechanism 104 may include any suitable sub-mechanisms for determining the blower speed adjustment. For example, blower speed adjustment mechanism 104 may include a look-up table containing a series of temperature differences correlated with blower speeds necessary to correct the temperature differences. Alternatively, a proportional gain can be used to determine a blower adjustment command signal based on the product of the gain and the error. Further, additional feedback terms can be used to provide a proportional-integral-derivative (PID) feedback controller, thereby enabling improved temperature control depending on the system dynamics. Still other controller forms can be used, such as, for example: an optimal controller minimizing a defined term, combined open loop and closed loop controls, lead-lag compensation, non-linear controls, adaptive controls, or combinations thereof.

Blower power feedback mechanism 100 may be configured to adjust the power of the blower 32 in any suitable manner. For example, blower power feedback 100 mechanism may include a duty cycle adjustment mechanism 106 that adjusts the power provided to the blower via pulse width modulation. Alternatively, proportional derivative control can be used for speed adjustment.

Blower power feedback mechanism 100 also may be configured to compensate for any gain or non-linear corrections required for a particular system in which the mechanism 100 is implemented. Any such correction mechanisms are shown collectively at 108.

After performing the blower power adjustment and any corrections, a temperature feedback mechanism 110 takes one or more temperature measurements from one or more selected locations within the interior of the projection device, and provides an average of the measured temperatures to summing junction 102 as the above-mentioned feedback temperature. At this point, blower power feedback mechanism 100 may begin the blower power adjustment process anew.

Blower power feedback mechanism 100 may also include a stall detection mechanism 112 that monitors the rotation speed of the blower 32, and may be configured to shut the blower 32 down if the rotation speed drops below a preselected speed. This stall mechanism 112 may help to protect components of the projection device from damage in the event of a blower malfunction.

Blower power feedback mechanism 100 may utilize any suitable methods to accomplish the above-described mechanisms. One example of a suitable method is shown in the flowchart routine of FIG. 3. It will be appreciated that the method set forth in FIG. 3 is merely exemplary, and that any other suitable methods may be used.

Figure 3:
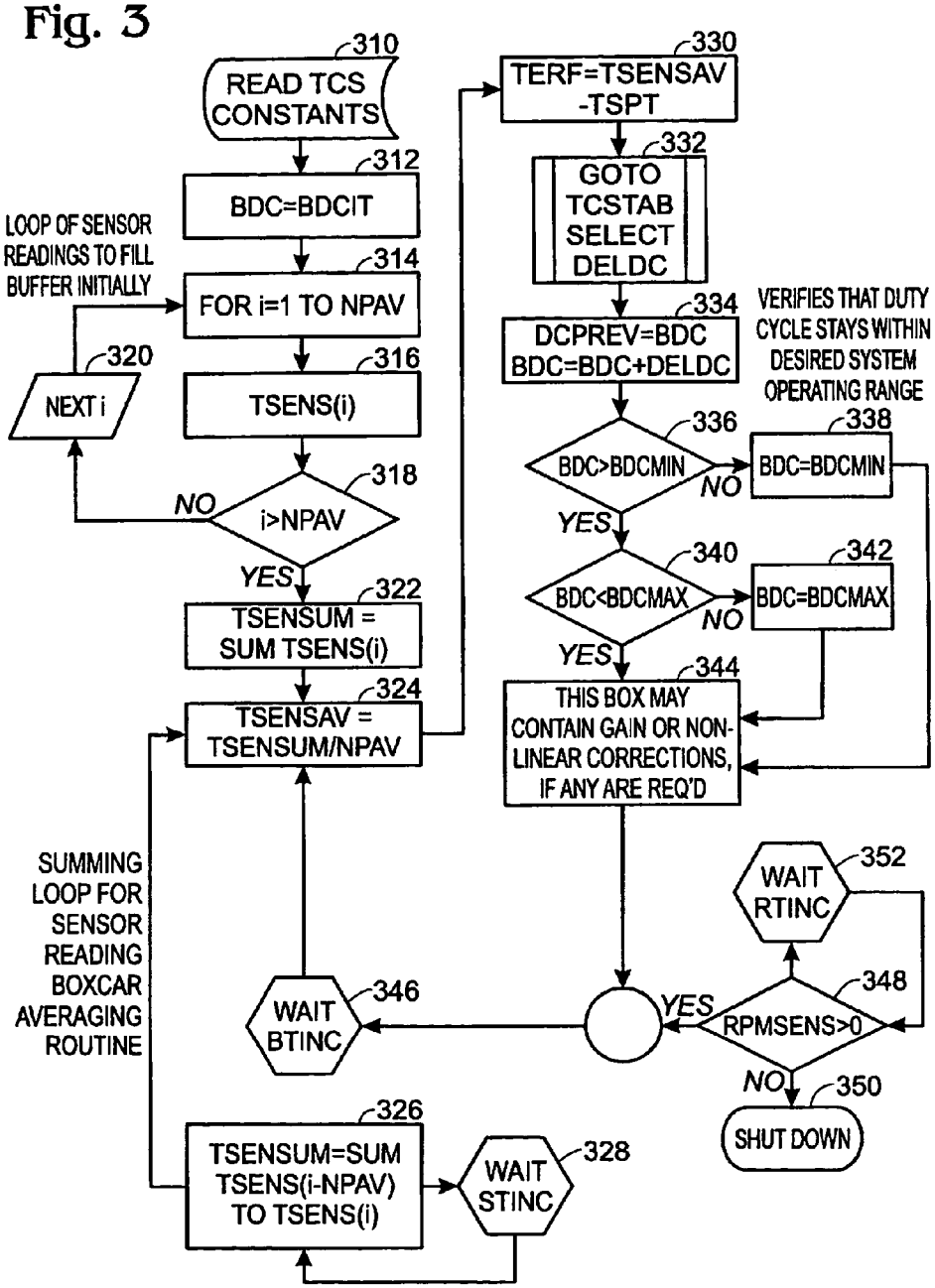
FIG. 3 is a flow diagram showing a detailed implementation of the embodiment of FIG. 2.

Referring now specifically to FIG. 3, a routine is shown for controlling temperature in the projection device. First, in step 310, the routine reads calibratable constant values (TCS) specific to the type of projection device being controlled. These values may include:

BDCIT—initial software controlled blower duty cycle when temperature sensing information is not available or not yet read.
BDCMIN—lower duty cycle threshold.
BDCMAX—upper duty cycle threshold.
GB—blower drive gain.
NPAV—number of sensor readings used in sample averaging routine.
STINC—sensor time step increments.
BTINC—blower adjustment time step increments.
RTINC—RPM monitoring time step increments.
TSPT—temperature set-point.
TCSTAB—a (2×21 array)—which contains stored duty cycle deltas to be used as a function of the temperature error.

After reading these values, in step 312, the routine sets an initial software controlled duty cycle command (BDC) to a blower to initial blower duty cycle command (BDCIT). Specifically, the initial blower duty cycle command (BDCIT) may be used when temperature sensing information is not available or not yet read. Next, in step 314, the routine starts a loop that cycles through to obtain a total number of sensor samples (NPAV) upon start up. The routine loops through steps 316, 318, 320, back to step 314. In some embodiments, the number (NPAV) can be selected to equal the number of sensors, or be selected to provide a desired number of readings of all available sensors. In the case where only a single sensor is used, it can represent the number of samples of that single sensor used to calculate an average temperature.

In step 316, the routine reads the sensor value into an array (TSENS), which may represent the temperature sensor reading(s). Then, in step 318, the routine determines whether the current index (i) is greater than the total number of samples to be obtained for averaging (NPAV). If not, the routine continues to step 320 to increment index i, before returning to step 314. Alternatively, the routine continues to step 322.

In step 322, the routine then may calculate a temperature sum (TSENSUM) by, for example, summing each value in the array (TSENS). Next, in step 324, the routine may calculate a sample average temperature (TSENSAV), which can be indicative of the average temperature sensor reading. This may include an average reading from a single sensor, or an average reading over a plurality of sensors in different locations of the projection device.

The sample average temperature (TSENSAV) may be calculated by dividing the temperature sum (TSENSUM) by the number of samples (NPAV) using the above initial sensor readings. However, during operation after initial startup, the sample average temperature (TSENSAV) may be calculated using an alternative approach, as illustrated in steps 326 and 328, where a summing loop for reading and sampling the sensor with boxcar (or moving) averaging may be used. Specifically, in step 326, the routine calculates the temperature sum (TSENSUM) based on the sensed temperatures (TSENS) using a moving average algorithm to potentially reduce processing calculations and therefore possibly increase processor speed. In other words, the temperature sum (TSENSUM) may be calculated over the last NPAV samples taken. This calculation may be performed every time a new temperature sample is taken, and thus may be performed at sensor time step increments (STINC).

By using an average temperature, it may be possible to more accurately control a composite temperature in the projection device, and reduce potential sampling errors from aberrant sensor readings.

From step 324, the routine continues to step 330 where the difference (TERF) between the set-point temperature (TSPT) and the sample average temperature (or averaged sample temperature) (TSENSAV) may be calculated. Note that a single temperature set-point can be used, or it can be varied during projection device operation based on projection device operating conditions, such as light illumination level, exterior temperature, line voltage, or combinations thereof.

Then, in step 332, the routine uses a look-up table stored in memory where TERF is the input to the table, and the output is a duty cycle delta (DELDC) using the array TCSTAB. Alternatively, the array can be programmed into one or more dimensional functions that may compute a delta duty cycle (DELDC) based on the input TERF. Next, in step 334, the routine stores the current duty cycle and then determines the new duty cycle value based on the delta duty cycle (DELDC) of step 332. In one example, the current duty cycle (BDC) may be determined based on the previous duty cycle (DCPREV) plus the delta duty cycle (DELDC). Further, the routine may store the current duty cycle as the previous value for the next loop.

From step 334, the routine continues to step 336. The routine then determines whether the current duty cycle command (BDC) is greater than a minimum threshold (BDCMIN) in step 336, and whether the current duty cycle command (BDC) is less than a maximum threshold (BDCMAX) in step 340. If either threshold is activated, the routine sets the duty cycle to the threshold that was activated. In other words, if the answer to step 336 is NO, the routine sets the duty cycle (BDC) to the minimum threshold (BDCMIN) in step 338. Likewise, if the answer to step 340 is NO, the routine sets the duty cycle (BDC) to the maximum threshold (BDCMAX) in step 342. Alternatively, if the answer to both steps 336 and 340 is YES, then the routine continues to step 344. In this way, the duty cycle may be maintained in a desired range to reduce integrator wind-up, and/or out of range command signals.

In step 344, the routine optionally includes a linear blower gain (GB), or a non-linear gain to correct for non-linear system dynamics. Various types of non-linear gains could be used, such as, for example, gain schedules based on projection device operating conditions. Further, the non-linear gain could be used to cancel non-linearities between blower duty cycle and airflow, or non-linearities within the blower motor 32.

From step 344, the routine continues to step 346 where it waits for a time increment BTINC before repeating.

Also, in some embodiments, the routine may include steps 348, 350, and 352 (which could be a separate routine, or sub routine) that also may lead to step 346, for monitoring blower speed and detecting a degraded, or stalled, blower. If the blower stalls, this can lead to degradation of the projection device, and thus such monitoring can be used to shut down the projection device and avoid such degradation. Specifically, in step 348, the routine determines whether the speed signal (RPMSENS) is greater than zero. If not, the routine shuts down in step 350. Further, this routine may be run every RTINC increment as illustrated by step 352.

Note that each of the time increments (the blower time increment (BTINC), the RPM monitoring time step increment (RTINC) and the sample time increment (STINC)) can be set to the same value or different values. For example, the sample time increment may be set lower so that more samples can be averaged for each blower adjustment. Likewise, the RPM monitoring increment can be set higher than the other increments to reduce processor loading.

In this way, it is possible to provide continuously variable adjustment of the blower speed to achieve improved temperature control and reduce noise.

Figure 4:
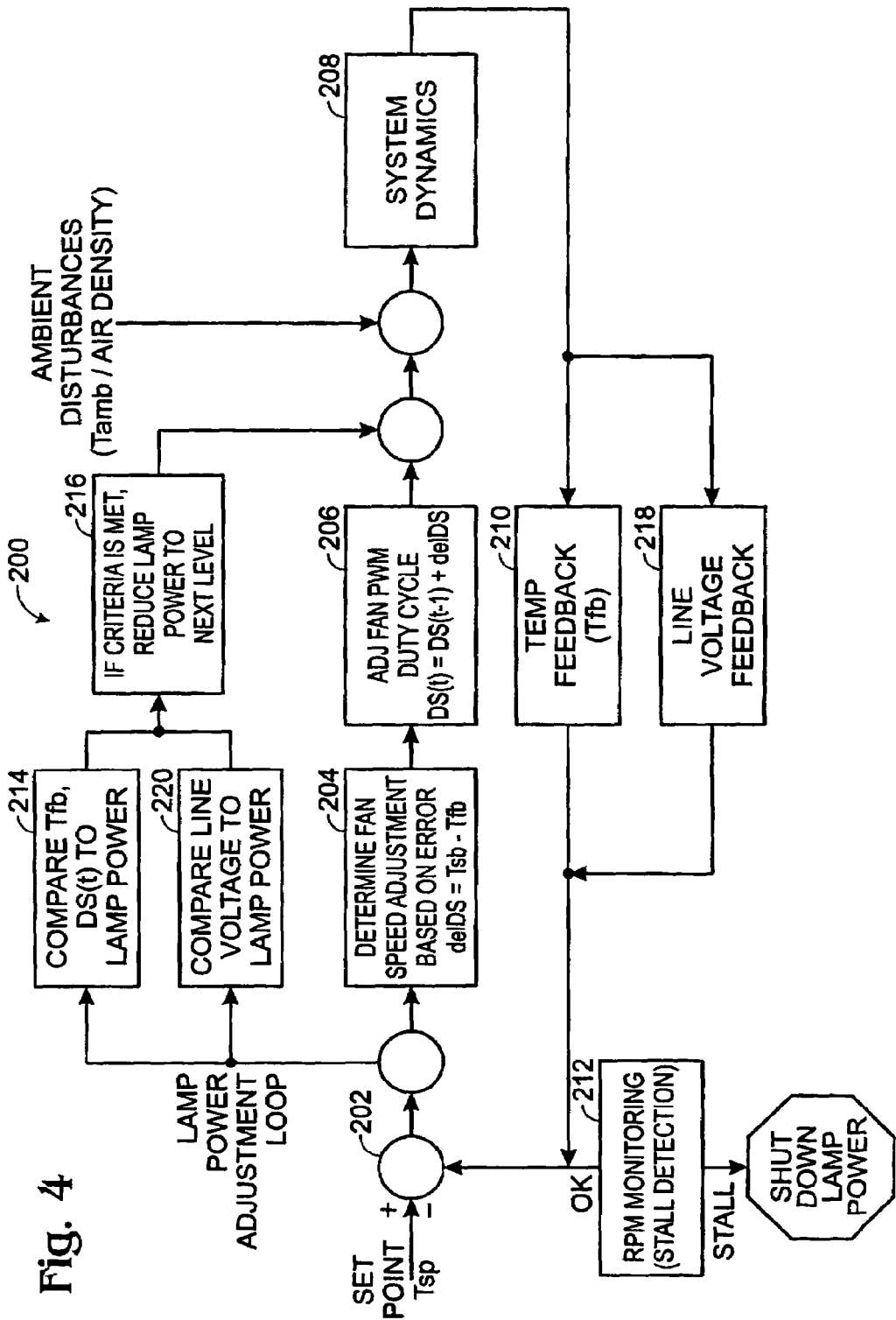
FIG. 4 is a block diagram showing an embodiment of a method of regulating the speed of a blower motor and the output power of a lamp.

FIG. 4 shows, generally at 200, an embodiment of a combination lamp and blower power feedback mechanism according to another embodiment. The blower power control mechanisms of lamp and blower power feedback mechanism 200 may include many of the same features as described above for blower power feedback mechanism 100. These features are indicated by numbering that corresponds to the similar features of mechanism 100. For example, lamp and blower power feedback mechanism 200 may include a temperature summing junction 202 similar to summing junction 102 of mechanism 100. The function of these similar mechanisms may be substantially similar to those described above for blower power feedback mechanism 100, and are thus not described in further detail.

Lamp and blower power feedback mechanism 200 also may include a lamp power feedback sub-mechanism. The lamp power feedback sub-mechanism may help to cool the projection device by reducing the lamp power when the projection device is running hot. For example, a projection device may be configured to have two or more lamp power levels. One exemplary system would have a continuously variable lamp power level. Another exemplary multi-power level system would be a three-level system having a hi-bright mode, a normal mode, and a power save mode. In such a system, lamp and blower power feedback mechanism 200 may include a first lamp feedback mechanism 214 that compares the measured average projection device temperature (Tfb, determined by mechanism 210) to a preselected set point temperature (Tsp). If the measured temperature is greater than the preselected set point temperature, the lamp power may be scaled back to the next-lower power level, as indicated at 216.

Furthermore, lamp and blower power feedback mechanism 200 may also help to prevent damage to the projection device power supply caused by low line voltages. Where such a projection device is configured to operate at a line voltage of 110V, as commonly found in the U.S., the power supply may have to work much harder to supply power for the hi-bright mode in countries where the line voltage is lower (for example, Japan, where voltages of 85V may be found). Therefore, lamp and blower power feedback mechanism 200 may include a mechanism 218 for detecting the line voltage being supplied to the projection device, and a mechanism 220 for reducing the lamp power to a next-lower power level (or gradually reduce lamp power) if the line voltage is determined to be below a predetermined threshold.

Figure 5:
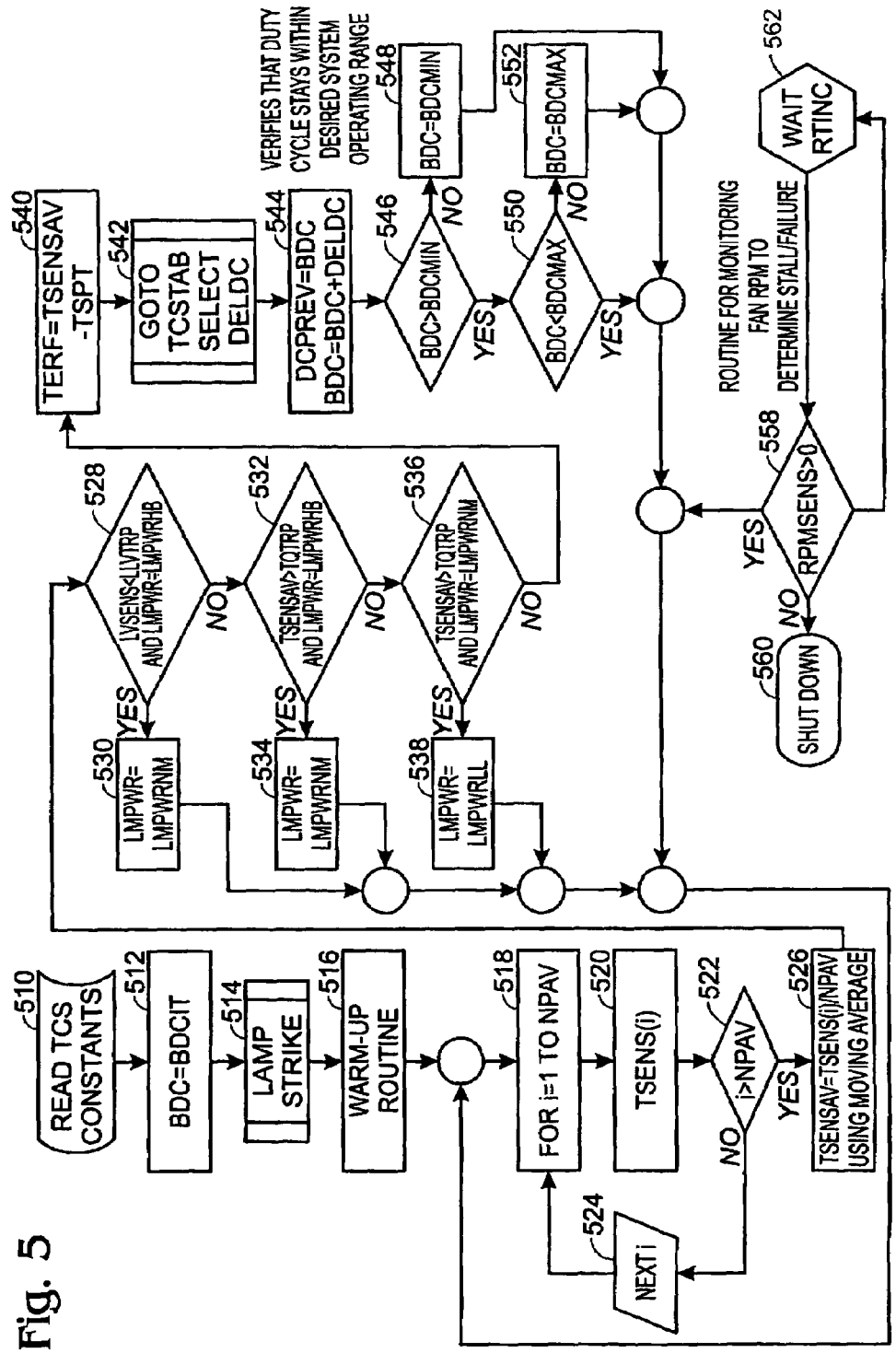
FIG. 5 is a flow diagram showing a detailed implementation of the embodiment of FIG. 4.

Lamp and blower power feedback mechanism 200 may utilize any suitable methods to accomplish the above-described mechanisms. One example of a suitable method is shown in the flowchart of FIG. 5. It will be appreciated that the method set forth in FIG. 5 is merely exemplary, and that any other suitable methods may be used.

Referring now specifically to FIG. 5, a routine is shown for controlling temperature in the projection device by dual control of the blower and lamp power. First, in step 510, the routine reads calibratable constant values (TCS) specific to the type of projection device being controlled. These values may include:

BDCIT—initial software controlled blower duty cycle when temperature sensing information is not available or not yet read.
BDCMIN—lower duty cycle threshold.
BDCMAX—upper duty cycle threshold.
GB—blower drive gain.
NPAV—number of initial sensor readings.
STINC—sensor time step increments.
RTINC—RPM monitoring time step increments.
TSPT—temperature set-point.
TQTRP—temperature versus power trip point.
LVSENS—line voltage sensor reading.
LLVTRP—lower line voltage trip point.
LMPWR—lamp power level setting.
LMPWRHB—a first lamp power level ("high-bright").
LMPWRNM—a second lamp power level ("normal").
LMPWRLL—a third lamp power level ("long life").
TCSTAB—a (2×21 array)—stored duty cycle deltas to be used as a function of the temperature error.

After reading the above values, in step 512, the routine sets the initial software controlled duty cycle command (BDC) to the blower to BDCIT. Specifically, the initial blower duty cycle command (BDCIT) may be used when temperature sensing information is not available or not yet read.

Then, in step 514, the routine lights the lamp (lamp strike). Then, in step 516, a warm-up routine may be performed to warm up the lamp in the projection device.

Various types of warm-up routines may be used. In one example, the warm-up routine may set the blower duty cycle to a fixed percentage (e.g., 20%, or less than 50%) until the first time the measured temperature reaches the set-point temperature. Then, the routine may continue to step 518. However, in some cases, this may cause overshoot of the blower duty cycle to maintain sufficient cooling, thereby potentially creating a rapid increase in noise, or overly load noise, that may distract users or spectators. Therefore, in an alternative embodiment, the warm-up routine can start the blower at a fixed duty cycle (e.g., 20%, or less than 50%), with an open-loop ramp up until the first time the measured temperature reaches the set-point, at which point the routine may continue to step 518. In this way, the open-loop ramp can be selected to provide a smooth transition upon commencement of closed loop control. Thus, such an open-loop ramp may reduce the overshoot once feedback temperature control is commenced, and thereby reduce abrupt noise changes, and/or overly load blower noise. Note that various types of open-loop ramps can be used, such as a time-based linear ramp, in which the blower duty cycle may be increased gradually over time (e.g., 0.5% every 30 seconds). Note also that various types of ramping rates can be used, and the ramping rate can be adjusted based on operating conditions of the projector, such as lamp power levels, line voltage levels, and/or combinations thereof.

Next, in step 518, the routine starts a loop that cycles through to obtain a total number of sensor samples (NPAV) upon start up. The routine loops through steps 520, 522, 524 and back to step 518. The number (NPAV) can be selected to equal the number of sensors, or be selected to provide a desired number of readings of all available sensors. In the case where only a single sensor is used, it can represent the number of samples of that single sensor.

In step 520, the routine reads the sensor value into an array (TSENS), representing the temperature sensor reading(s). Then, in step 522, the routine determines whether the current index (i) is greater than the total number of samples to be obtained for averaging (NPAV). If not, the routine continues to step 524 to increment index i, before returning to step 518. Alternatively, the routine continues to step 526.

In step 526, the routine calculates a sample average temperature (TSENSAV), which can be indicative of the average temperature sensor reading. This can include an average reading from a single sensor, or an average reading over a plurality of sensors in different locations of the projection device. The sample average temperature (TSENSAV) can be calculated using a moving average based on the number of samples (NPAV) and the current sensor reading TSENS(i).

From step 526, the routine continues to step 528. In step 528, the routine determines whether line voltage sensor reading (LVSENS) is less than low line voltage trip point (LLVTRP) and the lamp power setting (LMPWR) to a first power level ("high-bright") (LMPWRHB). When the answer to step 528 is YES, the routine continues to step 520 to set the lamp power (LMPWR) to a second power level ("normal") (LMPWRNM). From step 530, the routine may continue and returns to step 518.

When the answer to step 528 is NO, the routine continues to step 532 where a determination is made as to whether the average sensed temperature (TSENSAV) is greater than the temperature vs. power trip point (TQTRP) and the lamp power setting (LMPWR) is set to the first power level ("high-bright") (LMPWRHB). When the answer to step 532 is YES, the routine continues to step 534 to set the lamp power (LMPWR) to a second power level ("normal") (LMP-WRNM). From step 534, the routine may continue and returns to step 518.

When the answer to step 532 is NO, the routine continues to step 536 where a determination is made as to whether the average sensed temperature (TSENSAV) is greater than the temperature vs. power trip point (TQTRP) and the lamp power setting (LMPWR) is set to the second power level ("normal") (LMPWRNM). When the answer to step 536 is YES, the routine continues to step 538 to set the lamp power (LMPWR) to a third power level ("long life") (LMPWRLL). From step 538, the routine may continue and return to step 518.

When the answer to step 536 is NO, this indicates that blower control should be sufficient to maintain temperature without causing unacceptable annoyance due to consistent high speed operation at the current lamp power, and the routine continues to step 540. In step 540, the routine calculates the difference (TERF) between the set-point temperature (TSPT) and the sample average temperature (or averaged sample temperature) (TSENSAV). As noted above, a single temperature set-point can be used, or it can be varied during projection device operation based on projection device operating conditions, such as light illumination level, ambient air conditions (e.g. temperature and/or altitude), line voltage, or combinations thereof.

Then, in step 542, the routine uses a look up table stored in memory where TERF is the input to the table, and the output is a duty cycle delta (DELDC) using the array TCSTAB. Alternatively, the array can be programmed into a one or more dimensional function that computes a delta duty cycle (DELDC) based on the input (TERF). Next, in step 544, the routine stores the current duty cycle and then determines the new duty cycle value based on the delta duty cycle (DELDC) of step 542. In one example, the current duty cycle (BDC) may be determined based on the previous duty cycle (DCPREV) plus the delta duty cycle (DELDC). Further, in some embodiments, the routine may store the current duty cycle as the previous value for the next loop.

From step 544, the routine continues to step 546. The routine then determines whether the current duty cycle command (BDC) is greater than a minimum threshold (BDCMIN) in step 546, and whether the current duty cycle command (BDC) is less than a maximum threshold (BDCMAX) in step 550. If either threshold is activated, the routine sets the duty cycle to the threshold that was activated. In other words, if the answer to step 546 is NO, the routine sets the duty cycle (BDC) to the minimum threshold (BDCMIN) in step 548. Likewise, if the answer to step 550 is NO, the routine sets the duty cycle (BDC) to the maximum threshold (BDCMAX) in step 552. Alternatively, if the answer to both steps 546 and 550 is YES, then the routine continues to step 518.

Note that in step 544, the routine can optionally include a linear blower gain (GB), or a non-linear gain to correct for non-linear system dynamics, as discussed above.

Also, the routine may include steps 558, 560, and 562 (which could be a separate routine, or sub routine) that also leads to step 518, for monitoring blower speed and detecting a degraded, or stalled, blower. If the blower stalls, this can lead to degradation of the projection device, and thus such monitoring can be used to shut down the projection device and avoid such degradation. Specifically, in step 558, the routine determines whether the speed signal (RPMSENS) is greater than zero. If not, the routine shuts down in step 560. Further, this routine may be run every (RTINC) increment as illustrated by step 562.

In the routine of FIG. 5, both lamp power and blower power (and thereby blower speed) are adjusted to maintain the projection device (or components thereof) at a desired temperature, or temperature range. In one example, both lamp power and blower power are concurrently adjusted, while in others both are adjusted at different times. This coordinated control may enable compensation for the interactive effects between lamp heat generation and blower cooling. In this way, it can be possible to reduce high blower speed annoyances during projection device operation automatically, without requiring input from the user (although user input can be used, if desired, to override the automatic lamp power selection described above). In one specific example, it is possible to automatically compensate for variations in line voltages that heretofore have caused disadvantages in projection device operation. In another example, the sensed temperature is used to both adjust blower power, as well as lamp power, under selected conditions.

As such, this dual output temperature control uses both blower speed and lamp power level to maintain temperature, while reducing blower noise and compensating for variations in line voltage.

Note that while the above approach uses three discrete lamp power levels, a continuum of lamp power levels could be used. As such, in this approach, both lamp power and blower power (and thereby speed) can be controlled in a coordinated way to maintain temperature. Further, a hierarchy of control logic can be used to designate one actuation (e.g., lamp power) to be dictated by a first set of operating conditions (e.g., line voltage, sensed temperature, and/or combinations thereof), while another actuation (e.g., blower speed) can be dictated by a second set of operating conditions (e.g., measured temperature, desired temperature within the projection device, and/or combinations thereof). In this way, simplified, yet coordinated, control can be achieved. Further, in one example, lamp power control is provided overriding control if the temperature reaches a trip point beyond which blower control may be insufficient. Such a configuration therefore is able to maintain temperature with reduced, high speed blower operation, without requiring oversized blowers (thereby enabling smaller packaging for the projection device).

The disclosure set forth above encompasses multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the inventions includes all novel and nonobvious combinations and subcombinations of the various elements, features, functions, and/or properties disclosed herein.

Applicants reserve the right to submit claims directed to certain combinations and subcombinations of the disclosed invention that are regarded as novel and nonobvious. Inventions embodied in other combinations and subcombinations of features, functions, elements, and/or properties may be claimed through amendment of the claims or through presentation of new claims in this or a related application. Such claims, whether directed to a different invention or to the same invention, and whether broader, narrower, equal, or different in scope to the original claims, also are regarded as included within the subject matter of the inventions of the present disclosure.

What is claimed is:

1. A method for controlling temperature in a projection device, comprising:
   measuring a plurality of temperatures in the projection device over a plurality of sample times;
   averaging said plurality of temperatures to determine an averaged temperature;
   measuring a line voltage supplied to the projection device;
   automatically adjusting a power to a lamp of the projection device based on said line voltage supplied to the projection device;
   determining an error between a set-point temperature and said averaged temperature; and
   automatically adjusting a blower in said projection device based on said determined error.

2. The method of claim 1, further comprising adjusting a lamp power of a lamp in the projection device based on said averaged temperature.

3. The method of claim 2, wherein said averaging comprises calculating a boxcar average of said plurality of temperatures to determine said averaged temperature.

4. The method of claim 3, wherein said blower is adjusted based on said determined error and a non-linear gain.

5. A method for controlling temperature in a projection device having a lamp and a blower, comprising:
   measuring temperature in the projection device;
   measuring a line voltage supplied to the projection device; and
   selectively adjusting both a first signal to the blower and a second signal to the lamp based on said measured temperature and said line voltage supplied to the projection device to control temperature in the device, where said second signal is adjusted to lower lamp power when said line voltage supplied to the projection device is below a threshold.

6. The method of claim 5, wherein said second signal adjusts lamp power.

7. The method of claim 5, wherein said first signal adjusts blower power.

8. The method of claim 5, wherein said first signal adjusts blower speed.

9. The method of claim 5, wherein said second signal to the lamp is further adjusted based on a measured line voltage supplied to the projection device.

10. The method of claim 5, wherein said second signal to the lamp is further adjusted based on whether a measured line voltage supplied to the projection device is less than a threshold value.

11. The method of claim 5, wherein said first signal to the blower is adjusted based on a difference between said measured temperature and a set-point temperature.

12. The method of claim 11, wherein said first signal to blower is adjusted based on said determined difference and a non-linear gain.

13. The method of claim 5, wherein said measured temperature is averaged using a boxcar average routine.

14. The method of claim 5, wherein said second signal to the lamp is adjusted based on whether said measured temperature is greater than a threshold value.

15. The method of claim 5, wherein said lamp has at least two discrete power levels.

16. The method of claim 15, wherein said lamp has more than two discrete power levels, and said signals are concurrently adjusted.

17. A method for controlling temperature in a projection device having a lamp and a blower, comprising:
   measuring temperature in the projection device;
   measuring line voltage supplied to the projection device;
   averaging said measured temperature;
   adjusting a first signal to the blower to adjust blower speed based on said averaged temperature and a set-point temperature; and
   adjusting a second signal to the lamp to adjust lamp power based on said averaged temperature and said measured line voltage supplied to the projection device.

18. The method of claim 17, wherein said second signal to the lamp is further adjusted based on a current lamp power setting.

19. The method of claim 18, wherein said measured temperature is averaged using a boxcar average routine.

20. The method of claim 18, wherein said first signal to the blower is adjusted based on an error between said averaged temperature and said set-point temperature.

21. A method for controlling temperature in a projection device having a lamp and a blower, comprising:
   adjusting a first signal to the blower to adjust blower speed based on a first set of projection device operating conditions; and
   adjusting a second signal to the lamp to adjust lamp power based on a second set of projection device operating conditions, where at least one of said first and second signals is further adjusted based on a measured line voltage supplied to the projection device.

22. The method of claim 21, wherein said first set of operating conditions include at least a measured temperature and a set-point temperature, and said second set of operating conditions include at least a measured line voltage supplied to the projection device and said measured temperature.

23. A projection device comprising:
   a lamp;
   a blower; and
   a combination lamp and blower power feedback mechanism configured to selectively adjust both said blower and said lamp based on a measured line voltage supplied to the projection device to maintain temperature within the projection device, where said mechanism is further configured to generate a first lamp power for a first measured line voltage supplied to the projection device, and to generate a second, lower, lamp power for a second, lower, measured line voltage supplied to the projection device.

24. The projection device of claim 23, further comprising at least one temperature sensor, wherein said lamp and blower power feedback mechanism is further configured to selectively adjust both said blower and said lamp based on said temperature sensor.

25. The projection device of claim 23, further comprising a power source wherein said lamp and blower power feedback mechanism is further configured to selectively adjust at least one of said lamp and said blower based on a line voltage supplied to said power source.

26. A system for controlling a lamp and blower of a projector, comprising:
   a combination lamp and blower power feedback mechanism configured to measure temperature, and selectively adjust both the blower and the lamp based on a measured line voltage supplied to the projector, to maintain said measured temperature at a desired value and is further configured to generate a first lamp power for a first measured line voltage supplied to the projector, and to generate a second, lower, lamp power for a second, lower, measured line voltage supplied to the projector.

* * * * *